May 6, 1958 H. G. AHLICH ET AL 2,832,994
ACCESSORY APPARATUS FOR MAKING BLOWN POLYSTYRENE FILM
Filed Aug. 16, 1956
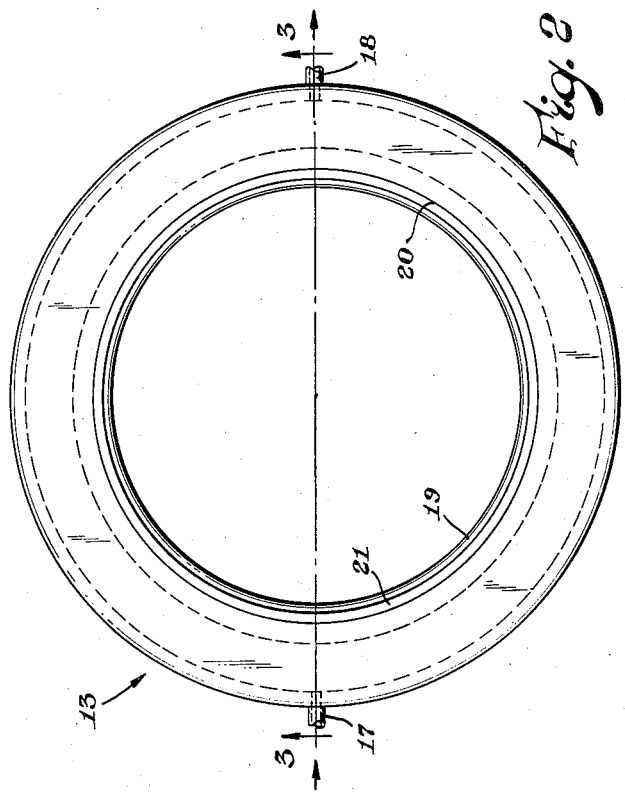
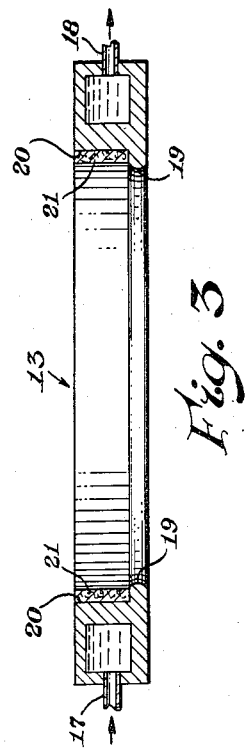
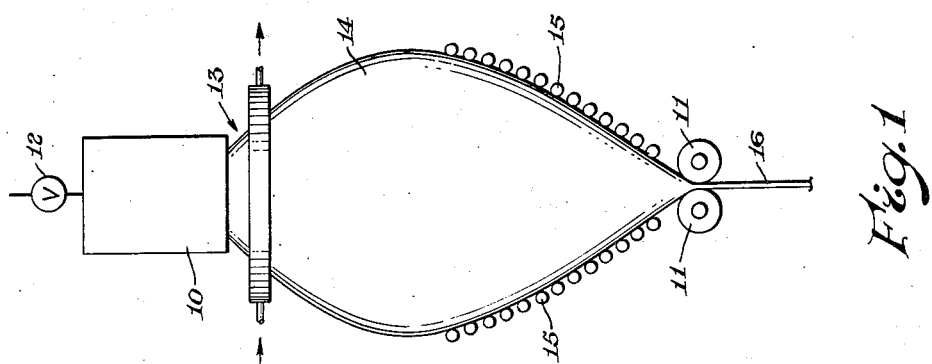
INVENTORS.
Harold G. Ahlich
Eugene F. Habowski
BY
Griswold & Burdick
ATTORNEYS United States Patent Office 2,832,994
Patented May 6, 1958

2,832,994
ACCESSORY APPARATUS FOR MAKING BLOWN POLYSTYRENE FILM

Harold G. Ahlich, Midland, and Eugene F. Habowski, Bay City, Mich., assignors to The Dow Chemical Company, Midland, Mich., a corporation of Delaware Application August 16, 1956, Serial No. 604,526

2 Claims. (Cl. 18—14)

This invention relates to certain accessory apparatus useful in the production of tubular polystyrene film by the so-called trapped bubble process. It has particular reference to a guide ring structure to aid in cooling the freshly extruded polymer and to prevent oscillation in the distended tube.

There are two principal ways to make polystyrene film. One involves the extrusion of the polymer as a flat sheet through a slit orifice, followed by stretching to effect orientation and resultant improvement in tensile strength. A serious limitation of such a process lies in the difficulty of accomplishing biaxial stretching. Hence, the product most commonly has far greater strength in one direction than in the transverse direction, and such a product is less useful for many purposes than one which has been stretched approximately to the same extent both in the "machine direction" and in a direction transverse thereto.

The other principal procedure is one which accomplishes the desired biaxial stretching. The process involves extrusion of the polystyrene in tubular form. The freshly extruded tube is inflated just after it leaves the orifice, and the air or other gas used for inflation is trapped between the extrusion die and a pair of pinch rolls. The amount of trapped gas is selected to effect the desired radial distention of the tube, and the pinch rolls are caused to turn at a peripheral speed such as to accomplish a like amount of longitudinal stretching of the tubular film. Such a process yields a film product which has essentially the same degree of orientation and hence the same strength in the machine direction and transverse thereto.

The described trapped bubble process for making polystyrene film presents some difficulties, particularly in the matter of obtaining film of uniform thickness or "gauge." The length and diameter of the distended bubble are such as to make the bubble subject to oscillation caused by any slight movement of the surrounding atmosphere. Any such deflection or bending of the axis of the tube out of the linear path between the orifice and the pinch rolls puts a strain on part of the hot plastic leaving the orifice. This results in a reduction in thickness of that portion of the tube and a compensating increase in thickness of other portions as to which the normal tension is temporarily relieved. In consequence, the finished film has areas which are thinner than desired and others which are thicker than desired. Means for avoiding the described difficulties are much to be desired, and it is the principal object of this invention to provide such means.

The accessory apparatus of the present invention is an internally cooled metal ring, of a diameter greater than that of the tube-forming orifice but smaller than the largest diameter of the distended tubular bubble, adapted to be positioned parallel to and coaxially with the extrusion orifice and spaced therefrom. The inwardly directed face of the ring provides circumferential metal contact with the advancing film bubble and is preferably provided with a circumferential ring of absorptive and non-abrasive felt or fabric to take up any liquid which might condense on the moving film surface. The structure and its operation will be described with reference to the accompanying drawing, wherein Fig. 1 is a schematic flow diagram of the trapped bubble method of film production, showing the disposition in use of the guide ring of the invention;

Fig. 2 is a plan view of the guide ring; and

Fig. 3 is an elevational section taken along line 3—3 of Fig. 2.

In the method illustrated in Fig. 1, polystyrene is extruded at about 150° C. from a tube-forming die 10 illustrated as being downwardly directed and having a vertical axis. The tube is fed through the nip of pinch rolls 11 and is inflated by means of air supplied through valved line 12 which passes through die 10. Guide ring 13 is positioned beneath die 10, parallel to and coaxial therewith. A liquid coolant, at any temperature beneath the softening or second order transition point of the film-forming material is circulated through ring 13. The inflated tube 14 is in sliding contact with ring 13 and is cooled thereby promptly to a temperature such that the plastic material is no longer fluid and that it requires a positive application of force to complete its distention. Ring 13 is rigidly mounted, and it serves the added function of holding the inflated tube 14 symmetrically about the extrusion centerline. Further to guide and stabilize the inflated tube 14, there may be provided two sets of parallel rollers 15 converging toward the nip between pinch rolls 11 so as to change gradually the cross-sectional shape of tube 14 from circular to elliptical, with increasing eccentricity, until the collapsed tube is flattened by rolls 11. The flattened tube 16, after further cooling if required, may be slit to provide one or more flat films or it may be used in its tubular condition.

The guide ring 13 is shown in greater detail in Figs. 2 and 3. Ring 13 is hollow and is provided with an inlet 17 and an outlet 18 for a liquid coolant. Ring 13 is preferably provided with a polished metal rounded bead 19 circumferentially disposed along one edge of the inner face 20 of the ring. Abutting bead 19 and covering much of the remainder of the inner face 20 of ring 13 is positioned a band or ring of absorptive material 21, suitably of felt or fabric.

In practice, the coolant may be at any fixed temperature from 15° to about 60° C. Temperatures near 30° C. are preferred. The film tube 14 maintains sliding contact with bead 19 of ring 13. Any moisture from the air or volatile matter from the hot plastic, which may tend to condense on the relatively cool upper or inner surfaces of the ring, is absorbed by the protective strip of material 21 and is thus prevented from falling on the surface of the film tube 14 while the latter is still undergoing both radial and longitudinal stretching.

When the guide ring 13 is not used in the trapped bubble process, it is common experience to produce polystyrene film of nominal 1 mil thickness having actual thicknesses as low as 0.0006 inch and as great as 0.0014 inch. When the ring is used, however, it is common experience for film of the same nominal thickness to have actual thicknesses in the range from 0.0009 to 0.0011 inch, and even smaller deviations normally prevail.

We claim:

1. Accessory apparatus for use in the trapped bubble process for making thermoplastic film comprising, in association with a tube forming plastics extruder and a pair of pinch rolls disposed with their nip centered transversely on the extrusion centerline, a hollow metal ring of internal diameter greater than that of the orifice of the tube forming extruder but smaller than that of an inflated film tube to be produced in the apparatus, said ring having an inlet and an outlet for circulation therein of liquid coolant, and having a smooth metal bead circumferentially disposed along one edge of the inner face of said ring, to provide a single circumferential line of contact between the ring and such inflated film tube, the ring being mounted coaxially with the tube forming extrusion die and spaced therefrom a short distance to serve as a guide for inflated plastic film tube during operation of the apparatus for its intended purpose.

2. In the combination claimed in claim 1, the improvement which comprises a circumferential strip of absorptive material disposed about the inner face of the said ring adjacent to said smooth metal bead.

References Cited in the file of this patent

UNITED STATES PATENTS 2,641,022    Kress _____ June 8, 1953